United States Patent Office 3,544,490
Patented Dec. 1, 1970

3,544,490
ETHYLENE POLYMER FOAM COMPOSITIONS
AND PROCESS FOR MAKING SAME
Richard L. Alexander, Greensburg, Ind., Donald G. Ashburn and Bert H. Clampitt, Overland Park, Kans., and Harry D. Anspon, Kansas City, Mo., assignors to Gulf Research & Development Company, Pittsburgh, Pa., a corporation of Delaware
No Drawing. Filed Jan. 4, 1967, Ser. No. 607,172
Int. Cl. C08f 47/10; C08j 1/20
U.S. Cl. 260—2.5
16 Claims

ABSTRACT OF THE DISCLOSURE

Superior open-cell free-rising foam compositions are prepared from polyethylene and ethylene-alkyl acrylate polymers by admixing a polyethylene or ethylene-alkyl acrylate polymer with an azodicarbon-amide blowing agent, a cross-linking agent, mono- and polyfunctional unsaturated monomeric cross-linking rate and viscosity control agents and subjecting the admixture to an elevated temperature.

BACKGROUND OF THE INVENTION

This invention relates to open-cell ethylene polymer foam compositions. In another aspect, this invention relates to polyethylene and ethylene-alkyl acrylate free-rising, open-cell foam compositions and a process for preparing such compositions.

It is known to produce foamed articles from cross-linked polyalkenes such as polyethylene. The foamed compositions are produced by subjecting the polyalkene to a cross-linking action employing conventional peroxide cross-linking agents with the foaming produced in some cases after cross-linking or, in the most favorable conditions, during cross-linking. Blowing agents are conventionally employed to produce the foamed product with the particular blowing agent selected having a decomposition temperature above the temperature at which the polyalkene softens.

In addition to the foamed composition produced from polyalkenes it is known to produce rubber and polyurethane foams by conventional processes. These conventional open cell foams have undersirable characteristics which limit their commercial application. The conventional open-cell foams produced by conventional processes become brittle, lose strength and generally degrade with use. Degradation of the conventional foams is rapidly accelerated upon exposure of the foams to ultraviolet light, water vapor and certain reactive gases such as ozone or nitrogen oxides.

SUMMARY OF THE INVENTION

By the invention free-rising, open-cell ethylene polymer foam compositions are prepared by introducing mono- and polyfunctional unsaturated monomers into a foam composition mixture comprising polyethylene and/or an ethylene-alkyl acrylate polymer, a decomposition-temperature modified azodicarbonamide, and cross-linking agent and heating the combined mixture to an elevated temperature. Optionally, a low-viscosity silicone is also introduced into the foam composition mixture as a nucleating agent prior to the heating step.

DESCRIPTION OF THE INVENTION

The ethylene polymers employed in preparing the foam compositions of this invention comprise polyethylene and/or the ethylene-alkyl acrylate copolymers having a melt index of at least 200 and preferably a melt index in the range of 1,000 to 3,000. The alkyl acrylates employed in preparing the ethylene-alkyl acrylate copolymers of this invention are the low molecular weight alkyl acrylates wherein the alkyl group contains from 1 to 4 carbon atoms.

The blowing agent employed for expansion of the foamable composition is azodicarbonamide, a nitrogen releasing agent which is used in conjunction with a catalyst or promoter selected for purposes of controlling the decomposition temperature of the azodicarbonamide. For purposes of this invention it is required that the decomposition temperatures of azodicarbonamide be lowered to a temperature in the range of 145 to 165° C. Catalysts or promoters found to be useful in lowering the decomposition temperature of azodicarbonamide include the organic soluble salts of zinc, cadmium, lead and barium. It is within the scope of the invention to employ other catalysts which are capable of reacting with the azodicarbonamide to form a metal salt of azodicarbamic acid. It has been observed that when employing CBP–2 (barium-zinc-cadmium oil soluble salts of organic acids), distributed by Carlisle Chemical Company, as the promoter that the ratio of azodicarbonamide to catalyst is normally in the range of 4:1 to 5:1. CBP–LO.24 (lead octoate) is another suitable promoter distributed by Carlisle. The concentration of azodicarbonamide in the foamable composition mixture is normally in the range of 1 to 15 parts per 100 parts of ethylene polymer utilized. Azodicarbonamide supplies heat upon decomposition, raising the temperature of the foam composition mixture to the temperature where the cross-linking agent decomposes and cross-links the ethylene polymer.

The cross-linking agent employed in preparation of the foam compositions is selected from dicumyl peroxide and di-tert-butyl ether of the dihydroperoxide of diisopropyl benzene having the structure

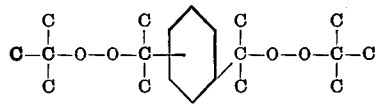

The concentration of cross-linking agent in the foam composition mixture is in the range of 1–7 parts per 100 parts of ethylene polymer with, preferably, a concentration of about 2 parts per 100 parts of ethylene polymer. The peroxide cross-linking agent stabilizes the ethylene polymer foam composition and improves the elevated temperature characteristics of the foam compositions prepared by the process of this invention.

The viscosity and cross-linking rate in the initial stages of expansion of the foam compositions are controlled by the addition of controlled amounts of mono- and polyfunctional unsaturated monomers of the type hereafter described. The monofunctional unsaturated monomer serves to lower the viscosity in the initial stages of cell nucleation and during the latter stages of cell nucleation increases the viscosity of the foam composition mixture, providing heat through polymerization, to effect an accelerated controlled rate of cross-linking. Those monofunctional unsaturated moonmers suitable in preparation of the foamed compositions in this invention are the alkyl acrylates soluble in the ethylene polymer having a boiling point above 150° C.

The rate of cross-linking is substantially increased by the addition of a polyfunctional unsaturated monomer to the foamable composition mixture. The polyfunctional unsaturated monomer also operates to substantially reduce tackiness of the product foam composition. The polyfunctional unsaturated monomers found useful in preparation of the product foam compositions of this invention have a boiling point above 150° C., preferably soluble in the ethylene polymer, and are selected from the group consisting of polyfunctional unsaturated esters, the divinyl benzenes, triallyl isocyanurate, and triallyl cyanurate. The polyfunctional unsaturated esters include the acrylate and methacrylate esters of glycols containing primary and/or secondary hydroxy groups and the polyallyl esters of polycarboxylic acids. The concentration of the mono- and polyfunctional unsaturated monomers in the foamable composition mixture is in the range from 1–20 and from 0.1–10 parts, respectively, per 100 parts of ethylene polymer.

The foamable composition mixture can optionally contain a low-viscosity silicone fluid which promotes the formation of stable, uniform fine-cell structure in the product foam composition. The viscosity of the silicone fluid should be less than 50 centistokes as measured by a Brookfield viscometer (Model LVF) employing a #1 spindle, a temperature of 25° C. and a spindle speed of 60 r.p.m.

A method of preparing the product foam compositions comprises melting the ethylene polymer at a temperature below the decomposition temperatures of the peroxide cross-linking agent and the decomposition-temperature reduced blowing agent. Azodicarbonamide, dicumyl peroxide, catalyst, mono- and polyfunctional unsaturated monomer constituents in the proper proportions are then blended with the melted ethylene polymer. The admixture is then heated in an oven to a temperature above the decomposition temperature of the peroxide and blowing agents and maintained at this temperature for the period of time required to produce a free-rising, open-cell polymer structure. Normally the temperature is maintained in the range of 150–170° C. Temperatures above this range may result in premature scorch and improper expansion of the foamable composition mixtures. Lower temperatures prevent the formation of the low density open-cell foamed structure.

The term "free-rising" refers to that property of the foamable composition mixture which is descriptive of the process of preparing an unsupported open-cell polymer foam structure in the absence of confining molds.

The product polymer foams prepared by the inventive process are of open-cell structure and can have densities as low as 2.2 pounds per cubic foot. The polymer foam products of this invention have excellent uniform open-cell structure, are light-stable and are non-collapsing. Additionally, the polymer foam compositions are water, nitrogen oxide and ozone resistant and are, therefore, particularly suitable for use in those areas where good weatherability is required. The polymer foam compositions prepared from ethylenealkyl acrylate copolymers wherein the acrylate concentration is at least 12 weight percent are highly flexible.

The product open-cell foam compositions contain cross-links of the etheylene polymer, cross-links composed of the alkyl acrylate, cross-links composed of the polyfunctional unsaturated monomer, and cross-links composed of the alkyl acrylate and polyfunctional unsaturated monomers. The foam compositions have particular utility in the upholstering of furniture that will be exposed to the weather. The weatherability of the product foams result in the foams being particularly suitable in the preparation of cushions for boats and in the fabrication of out-of-doors sporting equipment, generally. The open-cell foam compositions will also have utility in those areas where open-cell foams are conveniently employed.

The following examples are presented as illustrative of the objects and advantages of the invention and it is not intended that the invention should be limited to the specific embodiments presented therein.

EXAMPLE I 100 grams of an ethylene-methyl acrylate copolymer containing 18.0 weight percent methyl acrylate and having a melt index of 2000 is melted under infrared lamps at a temperature of 125° C. To the melted copolymer 8.0 grams of azodicarbonamide, 2.0 grams of CBP–2, 2.1 grams of dicumyl peroxide, 8.0 grams of lauryl acrylate, 1.5 grams of triallyl isocyanurate and 1.0 gram of silicone (Brookfield viscosity of 10 cps.) are added and the resulting mass mixed with a laboratory, lightning-type mixer for several minutes. Analysis of the CBP-2 promoter indicates that the promoter contains 0.4 weight percent barium, 0.2 weight percent zinc, 0.1 weight percent cadmium, 0.002 weight percent calcium, 0.001 weight percent strontium and a trace of iron. The mixture is then placed in a 150° C. oven and permitted to expand for 30 minutes. The product foam is removed and permitted to cool. The product is an open-cell, white, soft, flexible foam having a density of 3.2 pounds per cubic foot.

EXAMPLE II

To 100 grams of the melter ethylene-methyl acrylate copolymer of Example I is added 7.0 grams of azodicarbonamide, 2.0 grams of CBP–2, 2.1 grams of dicumyl peroxide, 6.0 grams of lauryl acrylate, 1.0 gram of divinyl benzene and 1.0 gram of silicone (Brookfield viscosity of 10 cps.). The mixture is stirred with a laboratory, lightning-type mixer for several minutes and then placed in a 150° C. oven where the mixture is permitted to expand for 30 minutes. The foam is removed and cooled. The product foam is a stable open-cell, white, soft, flexible foam.

EXAMPLE III

To 100 grams of the melted ethylene-methyl acrylate copolymer of Example I is added 8.0 grams of azodicarbonamide, 2.0 grams of CBP–2, 2.1 grams of dicumyl peroxide, 8.0 grams of lauryl acrylate, 1.0 gram of diallyl maleate and 1.0 gram of silicone (Brookfield viscosity of 10 cps.). The mixture is stirred with laboratory, lightning-type mixer for several minutes and then placed in a 150° C. oven where the mixture is permitted to expand for 30 minutes. The product foam is a stable open-cell, white, soft, flexible foam.

EXAMPLE IV

The procedure of Example III is repeated with the excepion that 1.0 gram of ethylene glycol dimethacrylate is employed in place of diallyl maleate. The product stable, open-cell, white, flexible foam has a density of 3.45 pounds per cubic foot.

EXAMPLE V

The procedure of Example I is repeated with the exception that 2.1 grams of a promoter Hercules S–890 (di-tert-butyl ether of the dihydroperoxide of diisopropyl benzene) is employed in place of dicumyl peroxide. The product open-cell foam is soft, flexible, white, and has a density of 3.45 pounds per cubic foot.

EXAMPLE VI 100 grams of an ethylene-methyl acrylate copolymer containing 9.3 weight percent methyl acrylate and having a melt index of 1500 is melted under infrared lamps at a temperature of 125° C. To the melted copolymer is added 7.2 grams of azodicarbonamide, 2.0 grams of CBP–2, 2.1 grams of dicumyl peroxide, and 1.0 gram of silicone (Brookfield viscosity of 10 cps.). The mixture is stirred with a laboratory, lightning-type mixer for several minutes and then placed in a 150° C. oven where the mixture is permitted to expand for 30 minutes. The product is unsuitable as a foam composition, demonstrating the necessity of utilizing an alkyl acrylate and a polyfunctional unsaturated monomer in preparation of a free-rising, open-cell foam composition.

EXAMPLE VII

To 100 grams of melted polyethylene having a melt index of 2000 is added 7.2 grams of azodicarbonamide, 2.0 grams of CBP–2, 2.1 grams of dicumyl peroxide, 6.0 grams LA, 1.5 grams of triallyl isocyanurate, and 1.0 gram of silicone (Brookfield viscosity of 10 cps.). The mixture is stirred with a laboratory, lightning-type mixer for several minutes and the mixture placed in a 150° C. oven where it is permitted to expand for 30 minutes. The resultant product is a stiff foam which depresses under load and recovers slowly when the load is removed.

EXAMPLE VIII

To 100 grams of the melted ethylene-methyl acrylate copolymer of Example I is added 10.0 grams of azodicarbonamide, 2.0 grams of CBP–2, 2.1 grams of dicumyl peroxide, 6 grams of lauryl acrylate and 1.5 grams of triallyl isocyanurate. The resulting mixture is stirred with a laboratory lightning-type mixer for several minutes and the stirred mixture placed in a 150° C. oven and permitted to expand for 30 minutes. The product foam is removed and permitted to cool. The product is a stable, open-cell, white, soft, flexible foam having a density of 2.2 pounds per cubic foot.

EXAMPLE IX

This example demonstrates the superior weatherability properties of the product foam compositions prepared by the invention. The product foam of Example I (Run 1) is compared with a polyurethane foam (Run 2) and a butadiene-styrene latex foam (Run 3) by subjecting the three foam compositions to the weatherometer tests described in ASTM D750–55T modified in that a relative humidity of 52 percent is employed instead of spraying water upon the test specimens. The results presented in terms of appearance and feel, are illustrative below in Table I.

TABLE I

| Run No. | Test | 24 hours | 72 hours | 96 hours | 396 hours |
|---|---|---|---|---|---|
| 1 | Color | White | White | White | White. |
| 1 | Feel | Soft | Soft | Soft | Soft. |
| 2 | Color | Brown | Dk. brown | Dk. Brown | Dk. brown. |
| 2 | Feel | Soft | Soft, beginning to crumble | Crumbling badly | Disintegrates upon touch. |
| 3 | Color | Very lt. tan | Brown | Brown | Brown. |
| 3 | Feel | Soft | Brittle surface layer | Brittleness deep in surface, beginning to crack. | Very friable on surface, brittleness about 1/16" deep. |

A comparison of the above results clearly demonstrates that the product foam (Run 1) is substantially superior over conventional polyurethane and latex foams in weather resistance. Whereas the product foam of the invention showed no degradation even after 396 hours the polyurethane and latex foams began to degrade after only 72 hours.

EXAMPLE X

The product foam prepared by the process of this invention are highly resistant to compressive force as demonstrated in this Example. Foams prepared by the process of Example I and having densities as illustrated below in Table II are subjected to compressive forces. In each run a 2-inch square sample of the product foam having a thickness in the range of 1 to 1½ inches is subjected to a compressive force so as to reduce the thickness 25 percent. The required force multiplied by 50 produces an Indention Load Deflection (ILD) value presented below in Table II.

TABLE II

| Run No. | Density, lbs. per cubic foot | ILD value |
|---|---|---|
| 3 | 3.0 | 15 |
| 4 | 3.2 | 14 |
| 5 | 3.6 | 21 |
| 6 | 4.2 | 31 |

The above procedure is repeated with the exception that the 2-inch square samples are subjected to a force required to reduce the thickness of the sample 65 percent of the original thickness. The ratio of the 65 percent to the 25 percent ILD values obtained is a measure of the compressive resistance of the product foam. The ratios for each of the above runs is presented below in Table III.

TABLE III

| Run No.: | Ratio |
|---|---|
| 3 | 2.81 |
| 4 | 3.45 |
| 5 | 3.13 |
| 6 | 2.93 |

Product foams having ratios exceeding 2 are considered commercially to be highly resistant to compressive force. Therefore, it is obvious from the above results obtained that the product foams of this invention have wide-spread utility in those areas where resistance to compressive forces is critical.

EXAMPLE XI

The ball-bounce resiliency of the product foams of this invention which is a measure of the "life" of a foam is demonstrated in this example. Applying a test described in ASTM D1564, sections 84–94, foams found to have wide commercial acceptance should lie in the range of 40 to 50 percent. The product foams produced by the process of Example I have a ball-bounce resiliency, employing the above-described test method, of 44 percent.

Although the invention has been described with reference to specific materials, embodiments and details, various modifications and changes, within the scope of this invention, will be apparent to one skilled in the art and are contemplated to be embraced in the invention.

What is claimed is:

1. A composition consisting essentially of an ethylene polymer selected from the group consisting of polyethylene and ethylene-alkyl acrylate copolymers having a melt index of at least 200, an azodicarbonamide blowing agent having a decomposition temperature in the range of 145 to 165° C., a cross-linking agent selected from the group consisting of dicumyl peroxide and di-tert-butyl ether of the dihydroperoxide of diisopropyl benzene, an alkyl acrylate monomer boiling above 150° C. and soluble in said ethylene polymer, the concentration of said alkyl monomer being in the range of 1–20 parts per 100 parts of said ethylene polymer, and a polyfunctional unsaturated monomer selected from the group consisting of polyfunctional unsaturated esters, divinyl benzenes, triallyl isocyanurate, and triallyl cyanurate, the concentration of said polyfunctional unsaturated monomer being in the range of 0.1 to 10 parts per 100 parts of ethylene polymer.

2. The composition of claim 1 to include a silicone having a Brookfield viscosity below 50 centistokes.

3. The composition of claim 1 wherein the concentration of azodicarbonamide is in the range of 1 to 15 parts per 100 parts of ethylene polymer, the concentration of said cross-linking agent is in the range of 1–7 parts per said 100 parts of ethylene polymer.

4. A process which consists essentially of forming an admixture at a temperature below the decomposition of the hereafter described axodicarbonamide and cross-linking agent of an ethylene polymer selected from the group consisting of polyethylene and ethylene-alkyl acrylate copolymers having a melt index of at least 200, azodicarbonamide, a promoter capable of reacting with the azodicarbonamide to reduce the decomposition temperature of the azodicarbonamide to within the range of 145–165° C., a cross-linking agent selected from the group consisting of dicumyl peroxide and di-tert-butyl ether of the dihydroperoxide of diisopropyl benzene, an alkyl acrylate monomer having a boiling point temperature above 150° C., the concentration of said alkyl monomer being in the range of 1-20 parts per 100 parts of ethylene polymer, and a polyfunctional unsaturated monomer selected from the group consisting of polyfunctional unsaturated esters, divinyl benzene, triallyl isocyanurate, and triallyl cyanurate, the concentration of the polyfunctional unsaturated monomer being in the range of 0.1 to 10 parts per 100 parts of ethylene polymer, heating the formed mixture to a temperature above the decomposition temperature of the azodicarbonamide and cross-linking agent, and maintaining the admixture at the elevated temperature for a time sufficient to permit the formation of free-rising, open-cell ethylene polymer foam composition.

5. The process of claim 4 wherein said elevated temperature is maintained in the range of 150-170° C.

6. The process of claim 4 wherein said cross-linking agent is dicumyl peroxide.

7. The process of claim 5 wherein said cross-linking agent is ducumyl peroxide, said alkyl acrylate is lauryl acrylate, and said polyfunctional unsaturated monomer is triallyl isocyanurate.

8. The process of claim 5 wherein said cross-linking agent is ducumyl peroxide, said alkyl acrylate is lauryl acrylate, and said polyfunctional unsaturated monomer is divinyl benzene.

9. The process of claim 5 wherein said cross-linking agent is ducumyl peroxide, said alkyl acrylate is lauryl acrylate, and said polyfunctional unsaturated monomer is diallyl maleate.

10. The process of claim 5 wherein said cross-linking agent is ducumyl peroxide, said alkyl acrylate is lauryl acrylate, and said polyfunctional unsaturated monomer is ethylene glycol dimethacrylate.

11. A free-rising, open-cell foam composition produced by the process of claim 4.

12. A free-rising, open-cell foam composition produced by the process of claim 5.

13. The process of claim 4 wherein the concentration of azodicarbonamide is in the range of 1 to 15 parts per 100 parts of said ethylene polymer and the concentration of cross-linking agents is in the range of 1-7 parts per 100 parts of said ethylene polymer.

14. The process of claim 13 wherein the concentration of said polyfunctional unsaturated monomer is less than about 2.0 parts per 100 parts of said ethylene polymer.

15. The process of claim 13 wherein said ethylene polymer comprises an ethylene-alkyl acrylate copolymer wherein the alkyl acrylate concentration is at least 12 weight percent.

16. The composition of claim 3 wherein said ethylene polymer is an ethylene-alkyl acrylate copolymer having an alkyl acrylate concentration of at least 12 weight percent.

References Cited

UNITED STATES PATENTS

| | | | |
|---|---|---|---|
| 2,966,471 | 12/1960 | Anspon | 260—2.5 R |
| 3,098,832 | 7/1963 | Pooley et al. | 260—2.5 |
| 3,227,665 | 1/1966 | Fourcade et al. | 260—2.5 |
| 3,413,244 | 11/1968 | Landler et al. | 260—2.5 |

MURRAY TILLMAN, Primary Examiner

M. FOELAK, Assistant Examiner

U.S. Cl. X.R.

260—23.7, 88.1, 94.9, 827, 878